(12) United States Patent
Garska et al.

(10) Patent No.: US 7,780,779 B2
(45) Date of Patent: Aug. 24, 2010

(54) METHOD FOR SEPARATING MIXTURE OF FINELY DIVIDED MINERALS

(75) Inventors: Michael J. Garska, Sandersville, GA (US); Ismail Yildirum, Milledgeville, GA (US); Robert J. Pruett, Milledgeville, GA (US); Johnny W. Larimore, Sandersville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 11/349,216

(22) Filed: Feb. 8, 2006

(65) Prior Publication Data

US 2006/0185557 A1 Aug. 24, 2006

Related U.S. Application Data

(60) Provisional application No. 60/654,970, filed on Feb. 23, 2005.

(51) Int. Cl.
*C04B 14/04* (2006.01)
(52) U.S. Cl. .................... 106/484; 485/486; 485/488
(58) Field of Classification Search ......... 106/484–488; 209/5
See application file for complete search history.

(56) References Cited

U.S. PATENT DOCUMENTS

| | | | |
|---|---|---|---|
| 3,450,257 A | | 6/1969 | Cundy |
| 3,709,709 A | * | 1/1973 | Torok et al. ................. 106/486 |
| 3,808,021 A | * | 4/1974 | Maynard .................... 106/484 |
| 4,017,324 A | | 4/1977 | Eggers |
| 4,227,920 A | | 10/1980 | Chapman et al. |
| 5,128,606 A | | 7/1992 | Gate et al. |
| 5,169,443 A | | 12/1992 | Willis et al. |
| 5,261,956 A | | 11/1993 | Dunaway et al. |
| 5,522,924 A | * | 6/1996 | Smith et al. ................. 106/488 |
| 5,576,617 A | | 11/1996 | Webb et al. |
| 5,624,488 A | * | 4/1997 | Forbus et al. ............... 106/484 |
| 5,685,900 A | * | 11/1997 | Yuan et al. .................. 106/487 |
| 5,840,113 A | | 11/1998 | Freeman et al. |
| 6,007,618 A | | 12/1999 | Norris et al. |
| 6,197,105 B1 | | 3/2001 | Freeman et al. |
| 6,312,511 B1 | * | 11/2001 | Bilimoria et al. ............ 106/486 |
| 6,378,703 B1 | | 4/2002 | Mathur et al. |
| 6,379,452 B1 | * | 4/2002 | Maxwell et al. ............. 106/486 |
| 6,402,826 B1 | * | 6/2002 | Yuan et al. .................. 106/486 |
| 6,564,199 B1 | | 5/2003 | Pruett et al. |
| 6,585,822 B2 | | 7/2003 | Berube et al. |
| 6,660,076 B2 | | 12/2003 | Valadares et al. |
| 7,122,080 B2 | | 10/2006 | Pruett et al. |
| 2003/0141224 A1 | * | 7/2003 | Pruett et al. .................... 209/5 |
| 2006/0047047 A1 | * | 3/2006 | Patel et al. .................. 524/447 |
| 2006/0086289 A1 | * | 4/2006 | Mathur et al. ............... 106/484 |
| 2006/0249051 A1 | | 11/2006 | Pruett et al. |
| 2006/0249270 A1 | | 11/2006 | Alves et al. |
| 2007/0221092 A1 | | 9/2007 | Brown et al. |

FOREIGN PATENT DOCUMENTS

| | | |
|---|---|---|
| EP | 0 528 078 | 2/1997 |
| GB | 2 240 398 | 2/1991 |
| WO | WO 00/32699 | 5/2000 |
| WO | WO 00/66510 | 11/2000 |
| WO | WO 03/093577 | 11/2003 |

OTHER PUBLICATIONS

Office Action dated Mar. 16, 2007, issued in U.S. Appl. No. 11/349,213.
Office Action dated Feb. 13, 2007, issued in U.S. Appl. No. 11/349,217.
Office Action dated Jul. 23, 2007, issued in U.S. Appl. No. 11/349,217.
Office Action dated Aug. 7, 2007, from co-pending U.S. Appl. No. 11/349,213.
Office Action dated Feb. 19, 2008, from co-pending U.S. Appl. No. 11/349,213.

(Continued)

*Primary Examiner*—Jerry Lorengo
*Assistant Examiner*—Shuangyi Abu Ali
(74) *Attorney, Agent, or Firm*—Finnegan, Henderson, Farabow, Garrett & Dunner, L.L.P.

(57) ABSTRACT

The Rio Capim Kaolin deposit contains a lower bed of soft kaolin clay that averages 10 meters thick, and an upper bed of "hard" kaolin ("RCC hard kaolin") that may be as thick as 6 to 8 meters. Due to their high impurity content fine particle size, cementetious nature, and high degree of particle aggregation, hard kaolins are difficult to process. Disclosed herein are compositions comprising kaolin having a particle size distribution such that at least about 90% of the kaolin has a particle size of less than 1 micron and a GE brightness of at least about 91, where the kaolin may be derived from a crude kaolin having a $Fe_2O_3$ content of at least about 1.0% by weight, and optionally comprises titania in an amount of at least about 1.5% by weight. Also disclosed herein are methods of refining the hard kaolins, such as RCC hard kaolins, by dispersing the kaolin with at least one anionic organic dispersant and at least one inorganic dispersant. Also disclosed are compositions comprising an aqueous kaolin slurry comprising the hard kaolin, such as an RCC hard kaolin, at least one anionic organic dispersant, and at least one inorganic dispersant. Also disclosed are products containing the refined kaolin, such as paints, paper coatings, and plastics.

27 Claims, No Drawings

OTHER PUBLICATIONS

Office Action dated Apr. 15, 2008, from co-pending U.S. Appl. No. 11/349,217.
Office Action dated Aug. 25, 2008, from co-pending U.S. Appl. No. 11/349,213.
Office Action dated Oct. 9, 2008, from co-pending U.S. Appl. No. 11/349,217.
Carneiro, B.S.; Angélica R.S.; Scheller, T.; de Castro; E.A.S.; and Neves, R.F., "Mineralogical and geochemical characterization of the hard kaolin from the Capim region, Pará, northern Brazil," Cerâmica 49, 2003, pp. 237-244, Abstract.
Kotschoubey, Basile; Truckenbrodt, Werner and Hieronymus, Bernard, "Deposits of Kaolin and semi-flint clay in northeastern Pará state, Brazil," Revista Brasileira de Geociências, vol. 26 (2), 1996, pp. 71-80, Abstract.
Office Action dated Dec. 23, 2008, from co-pending U.S. Appl. No. 11/349,213.
Office Action dated Jan. 28, 2009, from co-pending U.S. Appl. No. 11/349,217.
Office Action dated Jun. 30, 2009, for U.S. Appl. No. 11/349,213, filed Feb. 8, 2006 (11 pages).

* cited by examiner

METHOD FOR SEPARATING MIXTURE OF FINELY DIVIDED MINERALS

This application claims priority to U.S. Provisional Patent Application No. 60/654,970, filed Feb. 23, 2005.

Disclosed herein are compositions comprising dispersed kaolin obtained from the upper bed of the Rio Capim Kaolin deposit. Also disclosed are methods of refining this kaolin, and products obtained therefrom.

The Rio Capim Kaolin deposit contains a lower bed of soft kaolin clay that averages 10 meters thick, and an upper bed of "hard" kaolin ("RCC hard kaolin") that may be as thick as 6 to 8 meters. The hard kaolins are typically very fine and have a high content of impurities. The RCC hard kaolins can be distinguished from other hard kaolins, such as Georgia hard kaolins, by their higher titania and $Fe_2O_3$ content in combination with their small size. For example, crude Georgia hard kaolins typically will have a titania content on the order of 1.5%-2.5% and an $Fe_2O_3$ content of less than 1%. By comparison, the RCC hard kaolins can have titania levels greater than 1.5% by weight and an $Fe_2O_3$ content of at least about 1%, in some cases as high as 3%. The $Fe_2O_3$, $TiO_2$ and other discoloring impurities are typically extremely finely disseminated throughout the RCC hard clay phase as aggregates that can be difficult to disperse. SEM and other image analysis techniques have revealed that the particle size of discoloring impurities is in the nano-size range. As mined, the RCC hard kaolins are also difficult to disperse using conventional mechanical and chemical dispersion methods, which has made processing and beneficiation of these hard kaolins difficult. For these reasons only the lower bed of soft kaolin clay is currently being processed.

Accordingly, it would be desirable to develop a process for obtaining a useful product from the upper hard kaolin layer.

The present inventors have discovered that these hard kaolin clays can be effectively dispersed. One embodiment discloses an aqueous slurry comprising:

kaolin having a median particle size less than about 0.5 μm;
at least one anionic organic dispersant; and
at least one inorganic dispersant.

wherein the slurry has a solids content of at least 70% by weight of kaolin, the kaolin containing $TiO_2$ in an amount of at least about 1.5% by weight relative to the total weight of the solids content, and $Fe_2O_3$ in an amount of at least about 1% by weight relative to the total weight of the solids content.

Another embodiment provides a composition comprising kaolin having a particle size distribution such that at least about 90% of the kaolin has a particle size of less than about 1 μm and a GE brightness of at least about 91. In this embodiment, the kaolin may be derived from a crude kaolin having $Fe_2O_3$ in an amount of at least about 1.0% by weight, relative to the weight of the crude kaolin.

The kaolin can optionally comprise titania in an amount of at least about 1.5% by weight, relative to the weight of the crude kaolin. Alternatively, another embodiment provides a composition comprising kaolin having a particle size distribution such that at least about 90% of the kaolin has a particle size of less than 1 micron and a GE brightness of at least about 91, said kaolin being derived from a crude kaolin having a $Fe_2O_3$ content of at least about 1.0%.

Particle sizes, and other particle size properties referred to in the present disclosure, are measured using a SEDIGRAPH 5100 instrument as supplied by Micromeritics Corporation. The size of a given particle is expressed in terms of the diameter of a sphere of equivalent diameter, which sediments through the suspension, i.e., an equivalent spherical diameter or "esd."

All particle size data measured and reported herein, including in the examples, were taken in the above-described manner, with measurements made in water at the standard temperature under ambient air. All percentages and amounts expressed herein are by weight.

The mean particle size, or the $d_{50}$ value, is the value determined in this way of the particle esd at which there are 50% by weight of the particles, which have an esd less than that $d_{50}$ value.

In one embodiment, the kaolin has a median particle size ($d_{50}$) less than about 0.35 μm, such as a median particle size less than about 0.25 μm, or a median particle size less than about 0.15 μm.

In one embodiment, a source of the kaolin is a hard kaolin, such as a kaolin from the Para state of Brazil, e.g., the Rio Capim kaolin deposit, e.g., an RCC hard kaolin. RCC hard kaolins can have a high $TiO_2$ and $Fe_2O_3$ content. In one embodiment, the $TiO_2$ can be present in the slurry in an amount of at least about 2% by weight relative to the total weight of solids content, such as an amount of at least about 2.5% by weight relative to the total weight of solids content. In one embodiment, $Fe_2O_3$ is present in the slurry in an amount of at least about 1.2% by weight relative to the total weight of solids content, such as an amount of at least about 1.5% by weight relative to the total weight of solids content.

In one embodiment, the dispersion is effective at a high pH, such as a pH of at least about 9, a pH of at least about 9.5, a pH of at least about 10, or a pH of at least about 10.5, or even a pH of at least about 11. The high pH can be obtained by adding at least one pH regulator, such as pH regulators chosen from sodium hydroxide, ammonium hydroxide, sodium carbonate (soda ash), and potassium carbonate.

The dispersing agent in each case may be selected from dispersing agents known in the art for the dispersion of particulate minerals in an aqueous medium. In one embodiment, the at least one anionic organic dispersant is chosen from anionic organic polyelectrolytes. Exemplary polyelectrolytes include those comprising a polycarboxylate. The polycarboxylate can be chosen from homopolymers and copolymers containing at least one monomer residue (the portion of the polymer derived from the monomer) chosen from vinyl and olefinic groups substituted with at least one carboxylic acid group, and water soluble salts thereof. The at least one monomer residue can be derived from monomers chosen from acrylic acid, methacrylic acid, itaconic acid, chronic acid, fumaric acid, maleic acid, maleic anhydride, isocrotonic acid, undecylenic acid, angelic acid, and hydroxyacrylic acid.

In one embodiment, the polycarboxylate can have a number average molecular weight no greater than about 20,000, as measured by the method of gel permeation chromatography using a low angle laser light scattering detector. In another embodiment, the polycarboxylate has a number average molecular weight ranging from about 700 to about 10,000.

In one embodiment, the at least one anionic dispersant is chosen from partially and fully neutralized sodium polyacrylate. In another embodiment, the at least one anionic dispersant is chosen from partially and fully neutralized maleic anhydride copolymer.

The at least one inorganic dispersant may be chosen from phosphates and silicates. Exemplary inorganic dispersants include those chosen from sodium hexametaphosphate, tetrasodium pyrophosphate, tetrapotassium pyrophosphate, and sodium silicate.

Another embodiment of the present invention discloses a method of refining a hard kaolin composition, comprising:

combining to form a dispersed kaolin composition:
an aqueous slurry comprising the hard kaolin having a median particle size less than about 0.5 µm,
at least one anionic organic dispersant, and
at least one inorganic dispersant,
wherein the slurry has a solids content of at least about 70% by weight of kaolin, the kaolin containing $TiO_2$ in an amount of at least about 1.5% by weight relative to the total weight of the solids content, and $Fe_2O_3$ in an amount of at least about 1% by weight relative to the total weight of the solids content.

In one embodiment, the dispersed kaolin composition further comprises at least one pH regulator.

In one embodiment, the hard kaolin is an RCC hard kaolin, i.e., the source of the hard kaolin is the Rio Capim deposit.

The at least one anionic organic dispersant and at least one inorganic dispersant is useful for dispersing hard kaolin, such as the hard kaolin having the properties described above. In some cases it may also be necessary to subject the kaolin to a relatively high mixing energy in order to break up compacted masses of fine kaolin particles from the hard kaolin. For example, the hard kaolin can be blunged and then further dispersed with a relatively high energy mill such as a Kady® Mill (Kady International). Other potential high energy mixing systems may also be useful in the present invention, such as a Cowles® Dissolver.

Once the hard kaolin has been adequately dispersed, it can be subjected to one or more of beneficiation steps to remove undesirable impurities, such as magnetic separation, chemical leaching, froth flotation, selective flocculation, and ozone bleaching.

For example, the kaolin may be passed as a suspension through a high intensity magnetic separator to remove iron containing impurities. One example of magnetic separation is described in U.S. Pat. No. 5,522,924, the disclosure of which is incorporated herein by reference for its teachings of magnetic separation. A standard high intensity wet magnetic separator can be used. This process can also result in a brightness gain ranging from about 0.1 to about 10.0 units.

Also optionally, the kaolin can be subjected to a selective flocculation process in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte.

The refined clay slurry may be ozoned, leached (bleached), and/or filtered. The clay may then be acid flocculated and dried, or may be redispersed in a makedown tank and alternately spray dried. Details of a selective flocculation process can be found in U.S. Pat. No. 4,227,920 to Chapman and Anderson, the disclosure of which is incorporated herein by reference for its teachings of a selective flocculation process. In addition, U.S. Pat. No. 5,685,900 to Yuan et al., includes a description of an ozonation process, the disclosure of which is incorporated herein by reference for its teachings of an ozonation process.

An aqueous suspension of kaolin clay may be subjected to a froth flotation treatment operation to remove titanium containing impurities in the froth. The slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, the disclosure of which is incorporated herein by reference for its teaching of a flotation process. This process can result in an improved brightness in the kaolin pigment, e.g., a GE brightness gain ranging from about 0.1 to about 10.0 units.

Chemical leaching can be performed, for example, with a reductive leaching agent such as sodium hydrosulfite. The leaching agent may be added in a dose ranging from, for example, about 0.5 to 5.0 pounds per ton of kaolin, with certain embodiments containing less than about 4 pounds per ton on a dry basis. Other suitable reductive bleaching agents, such as formamidine sulphinic acid, sodium borohydride and sodium bisulfite, may also be employed. Reductive bleaching using sodium hydrosulfite can be carried out at an acidic pH, typically in the range of 2.0 to 4.0.

In one embodiment, the kaolin can be classified prior to and/or after the at least one beneficiation step. The classifying may be accomplished by using any method known to those of ordinary skill in the art. Exemplary methods include the use of screens, centrifuges (e.g., bird centrifuge), cyclones, and air classifiers. Screening can be performed with screens of a desired mesh, such as a 325 mesh screen. Other methods include gravity sedimentation or elutriation, any type of hydrocyclone apparatus, or, for example, a solid bowl decanter centrifuge, and disc nozzle centrifuge. The resultant coarse fraction may be discarded, used as a separate product or, for example, may be directed back to the blend tank as an auxiliary source for the coarse kaolin used in the method disclosed herein.

One embodiment of a method for refining kaolin is described herein. First, the crude slurry was then blunged with a high energy blunger. During the blunging stage, the pH of the slurry was increased to at least 10 by adding sodium hydroxide or ammonium hydroxide as pH regulators.

The slurry was then screened to remove +325 mesh material (grit) from clay. The kaolin particles in the screened material was selectively flocculated from discoloring impurities in a settling tank by addition of low anionicity and high molecular weight polymer with at least 1 million molecular weight at high pH (pH>11) to remove the fine titania impurities from the thickener overflow.

Ozone bleaching was performed to leach out any organic impurities that may be found in crude and to destroy the polymer that is used for the selective flocculation.

The clay was then classified at 92-98% less than 2 µm to remove any coarse discolored titania and iron oxide impurities.

A high intensity magnetic separation was performed, followed by chemical leaching to the selectively flocculated, ozone bleached and classified kaolin product to remove iron oxide impurities and to further enhance product brightness.

The final product, which may be a dispersed and beneficiated kaolin, can have a relatively high GE brightness such as a GE of at least about 88, or a GE brightness of at least about 89, at least about 90, at least about 91, or even at least about 92.

The final product can also have reduced impurity content, such as a titania content of less than about 1.0%, less than about 0.8%, less than about 0.5%, or less than about 0.25% by weight, relative to the total weight of the solids content. The $Fe_2O_3$ content of the final product can be less than about 1%, less than about 0.8%, or less than about 0.5% by weight, relative to the total weight of the solids content. In another embodiment, the final product comprises $Fe_2O_3$ in an amount ranging from about 0.5% to about 0.8% by weight, relative to the total weight of the solids content.

The kaolin refined from hard kaolin can be very fine with a particle size distribution such that at least about 95% of the particles has an esd less than 2 µm, such as at least about 97%, or even at least about 98% less than 2 µm, or a $d_{50}$ of less than about 0.5 µm (i.e., 50% of the particles have a particle size less than about 0.5 µm), such as a $d_{50}$ of less than about 0.35 µm, or a $d_{50}$ of less than about 0.25 µm. In another embodiment, at least about 92% of the dispersed and beneficiated kaolin composition has a particle size of less than about 1 µm.

In one embodiment, the kaolin refined from hard kaolin can also have dynes rheology. A kaolin having dynes rheology can be potentially useful in any of a number of applications such as in paints or in paper coatings.

Another embodiment of the present invention provides products comprising the kaolin refined from the hard kaolin, such as paints, paper coatings, and plastics.

Paint compositions can comprise the refined kaolin disclosed herein, and optionally at least one ingredient chosen from thickeners, dispersants, and biocides. The paint composition may also comprise at least one additional ingredient chosen from a polymeric binder, a primary pigment such as titanium dioxide, a secondary pigment such as calcium carbonate, silica, nepheline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions disclosed herein may also comprise other conventional additives, including, but not limited to, surfactants, thickeners, defoamers, wetting agents, dispersants, solvents, and coalescents.

Paper coatings disclosed herein can include, in addition to the refined kaolin as described above, materials generally used in the production of paper coatings and paper fillers. The compositions can include a binder and a pigment, such as $TiO_2$. The coatings may optionally include other additives, including, but not limited to, dispersants, cross linkers, water retention aids, viscosity modifiers or thickeners, lubricity or calendering aids, antifoamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilizers.

Any art recognized binder may be used in the compositions and products disclosed herein. Exemplary binders include, but are not limited to, adhesives derived from natural starch obtained from a known plant source, for example, wheat, corn, potato or tapioca; and synthetic binders, including styrene butadiene, acrylic latex, vinyl acetate latex, or styrene acrylic, casein, polyvinyl alcohol, polyvinyl acetate, or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one aspect, the binder is present in the paper coating in an amount ranging from about 3% to about 10%. In another aspect, the binder is present in the coating in an amount ranging from about 10% to about 30% by weight.

EXAMPLES

Example 1

This Example describes a method of separating kaolin from a Rio Capim kaolin deposit.

All low-shear Brookfield viscosities were measured using a #2 spindle at 20 rpm, and all high-shear Hercules viscosities using an "A" bob at 4400 rpm.

A dispersed aqueous slurry comprising the kaolin crude was blunged in a house-made high-shear mixer for 15 minutes by adding water to the crude at a high solids content (i.e., 70% solids). Sodium hexametaphosphates (SHMP) and sodium polyacrylate (C-211) were used as the dispersing reagents, while sodium hydroxide or sodium carbonate was used as the pH regulator. The slurry was then further dispersed with a Kady® Mill (Kady International)

Nine samples were subjected to the following specific steps:

Sample #1—Blunging was performed at 70% solids using 20 pounds/ton SHMP, 10 pounds/ton sodium polyacrylate (C-211, as received), and NaOH to provide a pH of approximately 10. Blunging occurred for 15 minutes, followed by dilution to approximately 40% solids, and screening with 325 mesh screen. The pH, temperature at ° C. and ° F., amount of NaOH (pounds/ton), +325 mesh residue, and Brookfield (#1 spindle@100 rpm's) was measured. Flocculation was performed at 10% solids at pH of approximately 11.5 using a high molecular weight, low anionicity co-polymer of acrylic/acrylamide.

Sample #2—same as #1, except use soda ash in place of NaOH.

Sample #3—blunging was the same as #1 for 30 minutes.

Sample #4—blunging was the same as #2 @ 60% solids.

Sample #5—blunging was the same as #2 @ 65% solids.

Sample #6—blunging was the same as #1 @ 75% solids for 30 minutes.

Sample #7—blunging was the same as #6 @~11.0 pH.

Sample #8—blunging was the same as #1, after degritting, Kady® Mill for 15 minutes.

Sample #9—blunging was the same as #1, 30 mins. on Cowles Dissolver before degritting.

Table I below lists the pH, temperature, and amounts of NaOH and soda ash that was added.

TABLE I

| Test No | Blunged Clay pH | | Blunged Slurry Temperature | | Addition Level, #/T | |
|---|---|---|---|---|---|---|
| | Initial | Final | ° C. | ° F. | NaOH | Soda Ash |
| #1 | 10.1 | 9.0 | 45 | 114 | 4.8 | — |
| #2 | 8.5 | 8.2 | 45 | 114 | | 3.3 |
| #3 | 10.4 | 8.4 | 56 | 133 | 5.2 | |
| #4 | 8.5 | 8.3 | 35 | 96 | | 3.3 |
| #5 | 8.5 | 8.5 | 40 | 106 | | 3.3 |
| #6 | 10.5 | 8.6 | 64 | 147 | 5.9 | |
| #7 | 11.4 | 9.6 | 69 | 156 | 6.6 | |
| #8 | 10.2 | 9.2 | 48 | 118 | 5.2 | |
| #9 | 10.2 | 9.1 | 46 | 115 | 5.2 | |
| #8: kady mill | 8.4 | 7.2 | 96 | 209 | | |
| #9: cowles | 9.2 | 8.9 | 31 | 88 | | |

Table II lists the particle size distribution data for each sample after blunging and degritting with 325 mesh screen.

TABLE II

| Test No | 10 µm | 5 µm | 2 µm | 1 µm | 0.5 µm | 0.25 µm |
|---|---|---|---|---|---|---|
| #1 | 96.1 | 92.8 | 86.1 | 79.5 | 69.3 | 47.9 |
| #2 | 96.5 | 93.1 | 85.7 | 76.2 | 68.3 | 47.3 |
| #3 | 97.4 | 94.5 | 87.4 | 80.0 | 70.5 | 49.7 |
| #4 | 98.0 | 93.0 | 85.5 | 78.1 | 68.1 | 45.8 |
| #5 | 98.8 | 93.0 | 86.8 | 79.2 | 68.7 | 46.8 |

TABLE II-continued

| Test No | 10 μm | 5 μm | 2 μm | 1 μm | 0.5 μm | 0.25 μm |
|---|---|---|---|---|---|---|
| #6 | 96.2 | 92.0 | 84.8 | 77.6 | 68.5 | 45.8 |
| #7 | 95.9 | 92.0 | 83.6 | 70.0 | 65.9 | 43.9 |
| #8 | 97.0 | 93.0 | 87.5 | 81.1 | 69.5 | 47.5 |
| #9 | 94.6 | 88.7 | 80.4 | 73.9 | 62.3 | 42.5 |

Table III lists the GE Brightness values along with the L, "a" and "b" values, after blunging, degritting and floccing the clay to remove impurities on the dispersed phase.

TABLE III

| Test No | GE Brightness | L | a | B |
|---|---|---|---|---|
| #1: Blunge Product | 69.20 | 86.91 | 3.89 | 5.53 |
| Flocc. Product | 75.94 | 89.98 | 3.23 | 4.30 |
| #2: Blunge Product | 69.57 | 87.06 | 3.80 | 5.40 |
| Flocc. Product | 75.40 | 89.66 | 3.26 | 4.26 |
| #3: Blunge Product | 69.16 | 88.87 | 3.86 | 5.50 |
| Flocc. Product | 76.35 | 90.07 | 3.18 | 4.11 |
| #4: Blunge Product | 70.14 | 87.30 | 3.74 | 5.30 |
| Flocc. Product | 74.97 | 89.54 | 3.25 | 4.48 |
| #5: Blunge Product | 69.20 | 86.77 | 3.87 | 5.34 |
| Flocc. Product | 74.93 | 89.48 | 3.34 | 4.42 |
| #6: Blunge Product | 66.22 | 85.25 | 4.07 | 5.72 |
| Flocc. Product | 77.02 | 90.19 | 2.87 | 3.74 |
| #7: Blunge Product | 67.86 | 86.07 | 9.82 | 5.50 |
| Flocc. Product | 76.98 | 90.21 | 2.86 | 9.81 |
| #8: Kady Mill Product | 66.33 | 85.15 | 4.05 | 5.52 |
| Flocc. Product | 77.25 | 90.11 | 2.94 | 3.45 |
| #9 Blunge Product | 67.01 | 85.49 | 3.93 | 5.43 |
| Flocc. Product | 76.27 | 89.67 | 2.96 | 3.61 |

Example 2

This Example describes another method for refining RCC kaolin with ozonation and magnetic separation processes.

The blunged crude kaolin had the following properties:

| GE Brightness | L | A | b | $TiO_2$ | $Fe_2O_3$ |
|---|---|---|---|---|---|
| 69.82 | 86.85 | 3.53 | 5.61 | 1.761 | 0.963 |

| PSD | 15 min. blunging using (4-L capacity) Waring blender | | | | |
|---|---|---|---|---|---|
| <10 μm | <5 μm | <2 μm | <1 μm | <0.5 μm | <0.25 μm |
| 94.5 | 90.4 | 82.3 | 75.3 | 64.4 | 42.1 |

Samples 10 and 11 were subjected to the following processes:

The crude clay was blunged for 15 minutes @ 70% solids using 15 pounds/ton SHMP and 10 pounds/ton C-211. NaOH was added to achieve a pH of approximately 10. The clay slurry was then screened at 325 mesh, followed by Kady® Mill processing for 15 minutes, and selective flocculation as described above for Samples 1-9.

After ozone bleaching, the kaolin was classified such that 92% to 98% of the particles were finer than 2 μm. Classification was carried out using a laboratory centrifuge to achieve the desired particle size cut. Magnetic separation was performed for 2.5 minutes retention time with a total cycle time of 10 min. The kaolin was then chemically leached with 2-6 pounds/ton of sodium hydrosulfite ($Na_2S_2O_4$) to remove soluble discolored impurities (i.e. iron oxide) from clay.

For Sample 10, all the dispersants were present during the blunging. A pH of approximately 10 was maintained by adding 0.1 mL NaOH every 5 minutes during the blunging process. For Sample 11, half the total amount of the dispersants were present at the start of the blunging process. The remaining 50% of dispersants were added half way through blunging while maintaining the pH as described for Sample 10.

Table IV shows the particle size distribution data for Samples 10 and 11 after each beneficiation stage.

TABLE IV

| Sample | 10 μm | 5 μm | 2 μm | 1 μm | 0.5 μm | 0.25 μm |
|---|---|---|---|---|---|---|
| #10 Kady mill product | 97.6 | 94.2 | 88.1 | 81.5 | 71.2 | 48.5 |
| #11 Kady mill product | 97.1 | 94.1 | 87.7 | 81.2 | 71.1 | 46.9 |
| #10 Ozone product | 97.3 | 94.3 | 87.4 | 80.8 | 70.6 | 47.1 |
| #11 Ozone product | 97.4 | 94.7 | 87.5 | 80.8 | 70.6 | 47.1 |
| #10 Class. product | 99.9 | 99.8 | 97.3 | 91.5 | 80.2 | 53.9 |
| #11 Class. product | 100.0 | 100.0 | 97.9 | 92.2 | 80.8 | 55.9 |
| Filter slip | 100.0 | 100.0 | 98.8 | 94.8 | 85.4 | 54.8 |
| Spray dried product | 99.8 | 99.2 | 98.1 | 93.9 | 84.1 | 54.1 |

Table V shows optical property data for Samples 10 and 11.

TABLE V

| | Sample | Brightness | L | a | b |
|---|---|---|---|---|---|
| #10 | Kady mill product | 73.03 | 88.48 | 3.19 | 4.61 |
| | Floc. Product | 77.47 | 90.22 | 2.96 | 3.47 |
| | Ozone product | 77.15 | 90.02 | 3.06 | 3.45 |
| | Class. Product | 79.19 | 91.25 | 3.01 | 3.52 |
| | Class. Rejects | 63.92 | 82.43 | 3.62 | 3.78 |
| | Magnetic Separation Product | | | | |
| | As is | 89.10 | 96.43 | 0.23 | 3.32 |
| | w/ 2#/T $Na_2S_2O_4$ | 89.76 | 96.58 | 0.21 | 3.05 |
| | w/ 4#/T $Na_2S_2O_4$ | 90.59 | 96.87 | −0.07 | 2.85 |
| | w/ 6#/T $Na_2S_2O_4$ | 90.58 | 96.86 | −0.06 | 2.83 |
| #11 | Kady mill product | 72.46 | 88.23 | 3.32 | 4.75 |
| | Floc. Product | 77.47 | 90.29 | 3.02 | 3.57 |
| | Ozone Product | 77.35 | 90.19 | 3.03 | 3.52 |
| | Class. Product | 78.85 | 91.08 | 3.05 | 3.59 |
| | Magnetic Separation Product | | | | |
| | As is | 88.75 | 96.14 | 0.38 | 3.16 |
| | w/ 2#/T $Na_2S_2O_4$ | 90.25 | 96.77 | 0.05 | 2.97 |
| | w/ 4#/T $Na_2S_2O_4$ | 90.64 | 96.91 | −0.02 | 2.86 |
| | w/ 6#/T $Na_2S_2O_4$ | 90.57 | 96.87 | −0.08 | 2.87 |
| | Spray dryer product | 90.29 | 96.74 | 0.06 | 2.95 |

Components a, b, and L are the color component values on the color space scale as measured by a Technibrite TB-1C instrument. "+a" is a measure of red tint; "−a" is a measure of green tint; "+b" is a measure of yellow tint; "−b" is a measure of blue tint; "L" is a measure of whiteness.

Table VI shows the impurities present in the final product for Sample #10.

TABLE VI

| Sample | $Al_2O_3$ (%) | $K_2O$ (%) | MgO (%) | $SiO_2$ (%) | $Na_2O$ (%) | $Fe_2O_3$ (%) | $TiO_2$ (%) | $P_2O_5$ (%) | CaO (%) | Ba (%) | S (%) | LOI[1] (%) | Total (%) |
|---|---|---|---|---|---|---|---|---|---|---|---|---|---|
| Sample #10 | 39.13 | <0.02 | <0.03 | 44.13 | 0.06 | 0.50 | 0.69 | <0.1 | <0.02 | <0.03 | 0.07 | 14.67 | 99.2 |

[1]LOI = loss on ignition

Table VII shows the particle size distribution data for the classified final product, the filter slip product, and the spray dried product. Also shown in this table are the values of low-shear Brookfield (#2 spindle @20 rpm) and Hercules viscosities (Bob A @4,400 rpm) of final product at 70% solids containing slurry.

TABLE VII

| Particle Size | Classified Final Product | Filter Slip Product | Spray Dried Product |
|---|---|---|---|
| <10 μm | 99.9 | 100.0 | 99.8 |
| <5 μm | 99.8 | 100.0 | 99.2 |
| <2 μm | 97.3 | 98.8 | 98.1 |
| <1 μm | 91.5 | 94.8 | 93.9 |
| <0.5 μm | 80.2 | 85.4 | 84.1 |
| <0.25 μm | 53.9 | 54.8 | 54.1 |
| $d_{30}$, μm | 0.13 | 0.15 | 0.14 |
| $d_{50}$, μm | 0.22 | 0.23 | 0.23 |
| $d_{70}$, μm | 0.38 | 0.34 | 0.35 |
| Steepness | 34 | 43 | 41 |
| Shape Factor | 3.1 | — | — |
| BET, $m^2/g$ | — | — | 17.9 |
| Brookfield viscosity @70% solids, #2 spindle @20 rpm | — | — | 208 cps |
| Hercules viscosity @70% solids, Bob A @4,400 rpm | — | — | 6.4 dynes |
| Overall Clay Recovery, % | 60.7% | — | — |

It can be seen from Tables V to VII above that the processes outlined in this Example provides a kaolin product from the Rio Capim deposit that is low in $Fe_2O_3$ and $TiO_2$ impurities having a very fine particle size. The final product obtained had 0.69% titania, 0.5% iron oxide and a GE brightness greater than 90.0 and at least 90.6. In addition, the clay product had a particle size of at least 97% less than 2 μm (in Table VII, at least 98% of the particles having a particle size less than about 1 μm) and the final clay slurry had dynes rheology.

Example 3

The properties of the starting hard kaolin sample from RCC deposit are shown in Table VIII below.

TABLE VIII

| Property | Value |
|---|---|
| GE Brightness | 72.53 |
| L | 88.28 |
| a | 3.46 |
| b | 4.78 |
| $TiO_2$ | 1.74 |
| $Fe_2O_3$ | 0.98 |
| PSD | |
| <10 μm | 94.0 |
| <5 μm | 90.1 |
| <2 μm | 81.9 |
| <1 μm | 75.0 |
| <0.5 μm | 64.9 |
| <0.25 μm | 37.2 |
| % Classification Recovery[1] | 78.4% |

[1]% Classification recovery is the recovery of the blunged and degritted product using 325 mesh screen at about 40% solids.

An aqueous slurry comprising 71.1% solids was blunged with 20 pounds/ton SHMP and 10 pounds/ton sodium polyacrylate. NaOH was added to achieve a pH of 11.4. Screening was performed with a 325 mesh screen.

Sample 12 [Sample E] was classified to 74% finer than 0.25 μm using a laboratory centrifuge. Sample 13 [Sample F] was classified to 67% finer than 0.25 μm with the same laboratory centrifuge. The classification product was then subjected to high intensity magnetic separation followed by bleaching with 2-10 lbs/ton sodium hydrosulfite and filtration.

Tables IX and X show the properties of Samples 12 and 13, respectively.

TABLE IX

| Property | Classification Product | Magnetic Separation Product | 2#/ton $Na_2S_2O_4$ | 4#/ton $Na_2S_2O_4$ | 6#/ton $Na_2S_2O_4$ | 8#/ton $Na_2S_2O_4$ | 10#/ton $Na_2S_2O_4$ |
|---|---|---|---|---|---|---|---|
| Brightness | 86.81 | 91.99 | 92.01 | 92.07 | 92.39 | 92.29 | 92.16 |
| L | 95.34 | 97.09 | 97.03 | 97.03 | 97.16 | 97.14 | 97.03 |
| a | 0.96 | 0.15 | 0.15 | 0.13 | 0.07 | 0.08 | 0.09 |
| b | 3.54 | 2.16 | 2.07 | 2.05 | 2.02 | 2.00 | 2.00 |
| $TiO_2$ | 0.32 | 0.23 | 0.23 | 0.22 | 0.23 | 0.24 | 0.24 |
| $Fe_2O_3$ | 0.53 | 0.48 | 0.51 | 0.51 | 0.51 | 0.52 | 0.51 |
| PSD | | | | | | | |
| <10 μm | 100 | | | | | | |
| <5 μm | 100 | | | | | | |
| <2 μm | 100 | | | | | | |
| <1 μm | 100 | | | | | | |
| <0.5 μm | 97.6 | | | | | | |
| <0.25 μm | 73.6 | | | | | | |
| % Material Recovery | 48.3% | ~93% | Overall clay recovery % | | | | 35.2% |

TABLE X

| Property | Classification Product | Magnetic Separation Product | 2#/ton $Na_2S_2O_4$ | 4#/ton $Na_2S_2O_4$ | 6#/ton $Na_2S_2O_4$ | 8#/ton $Na_2S_2O_4$ | 10#/ton $Na_2S_2O_4$ |
|---|---|---|---|---|---|---|---|
| GE Brightness | 81.65 | 90.89 | 91.18 | 91.29 | 91.53 | 91.88 | 91.97 |
| L | 93.25 | 96.90 | 96.90 | 96.91 | 96.99 | 97.11 | 97.11 |
| A | 2.24 | 0.16 | 0.16 | 0.08 | 0.09 | 0.01 | 0.05 |
| B | 4.48 | 2.70 | 2.56 | 2.49 | 2.41 | 2.38 | 2.30 |
| $TiO_2$ | 0.68 | 0.41 | 0.41 | 0.41 | 0.43 | 0.40 | 0.40 |
| $Fe_2O_3$ | 0.61 | 0.55 | 0.54 | 0.54 | 0.52 | 0.54 | 0.52 |
| PSD | 100 | | | | | | |
| <10 μm | 100 | | | | | | |
| <5 μm | 100 | | | | | | |
| <2 μm | 99.3 | | | | | | |
| <1 μm | 94.1 | | | | | | |
| <0.5 μm | 84.5 | | | | | | |
| <0.25 μm | 66.8 | | | | | | |
| % Material Recovery | 58.8% | ~93% | | Overall clay recovery % | | | 42.9% |

This Example demonstrates that classification prior to magnetic separation can provide very fine particulate material where 100% of the fines are less than 2 μm and the product after magnetic separation has a GE brightness of at least about 90.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising kaolin having a particle size distribution such that at least about 90% of the kaolin has a particle size of less than about 1 μm and a median particle size ($d_{50}$) ranging from 0.25 μm to less than about 0.35 μm, having an $Fe_2O_3$ content in an amount less than about 0.8% by weight relative to the total solids content, and a GE brightness of at least about 91, said kaolin being derived from a crude kaolin having $Fe_2O_3$ in an amount of at least about 1.0% by weight, relative to the weight of the crude kaolin, and a titania content of at least about 1.5% by weight, relative to the weight of the crude kaolin.

2. The composition according to claim 1, wherein the kaolin has a particle size distribution such that at least about 92% of the kaolin has a particle size less than about 1 μm.

3. The composition according to claim 1, wherein the kaolin has a particle size distribution such that at least about 95% of the kaolin has a particle size less than about 2 μm.

4. The composition according to claim 1, wherein the kaolin has a particle size distribution such that at least about 98% of the kaolin has a particle size less than about 2 μm.

5. The composition according to claim 1, wherein the kaolin comprises $TiO_2$ in an amount less than about 1% by weight relative to the total weight of the solids content.

6. The composition according to claim 1, wherein the kaolin comprises $TiO_2$ in an amount less than about 0.5% by weight relative to the total weight of the solids content.

7. The composition according to claim 1, wherein the kaolin comprises $TiO_2$ in an amount less than about 0.25% by weight relative to the total weight of the solids content.

8. The composition according to claim 1, wherein the kaolin comprises $TiO_2$ in an amount ranging from about 0.25% to about 1.5% by weight relative to the total weight of the solids content.

9. The composition according to claim 1, wherein the kaolin comprises $Fe_2O_3$ in an amount less than about 0.5% by weight relative to the total weight of the solids content.

10. The composition according to claim 1, wherein the kaolin comprises $Fe_2O_3$ in an amount ranging from about 0.5% to about 0.8% by weight relative to the total weight of the solids content.

11. The composition according to claim 1, wherein the kaolin composition has a GE brightness of at least about 92.

12. The composition according to claim 1, wherein the kaolin composition has dynes rheology, as determined by Hercules viscosity at 4,400 rpm using Bob A and Brookfield viscosity measurements at 20 rpm using #2 spindle.

13. A paint comprising the composition according to claim 1.

14. A paper coating composition comprising the composition according to claim 1.

15. A plastic comprising the composition according to claim 1.

16. A method of refining a hard kaolin composition deriving the composition according to claim 1, the method comprising: combining to form a dispersed kaolin composition: an aqueous slurry comprising the hard kaolin having a median particle size less than about 0.5 μm, at least one anionic organic dispersant, and at least one inorganic dispersant, wherein the slurry has a solids content of at least about 70% by weight of the hard kaolin, the kaolin containing TiO2 in an amount of at least about 1.5% by weight relative to the total weight of the solids content, and Fe2O3 in an amount of at least about 1% by weight relative to the total weight of the solids content.

17. The method according to claim 16, further comprising at least one beneficiation process chosen from blunging, screening, selective flocculation, froth flotation, ozone bleaching, chemical leaching, and high intensity magnetic separation.

18. The method according to claim 16, further comprising classifying the dispersed kaolin composition.

19. The method according to claim 16, further comprising spray drying the dispersed kaolin composition.

20. The method according to claim 17, wherein the dispersed and beneficiated kaolin composition contains $TiO_2$ in an amount less than about 0.8% by weight relative to the total weight of the solids content.

21. The method according to claim 17, wherein the dispersed and beneficiated kaolin composition contains $TiO_2$ in an amount less than about 0.5% by weight relative to the total weight of the solids content.

22. The method according to claim 17, wherein the dispersed and beneficiated kaolin composition contains $Fe_2O_3$ in an amount less than about 0.5% by weight relative to the total weight of the solids content.

23. The method according to claim 17, wherein the dispersed and beneficiated kaolin composition has a GE brightness of at least about 91.

24. The method according to claim 17, wherein the dispersed and beneficiated kaolin composition has dynes rheology, as determined by high-shear Hercules viscosity measurements at 4,400 rpm and low-shear Brookfield viscosity measurements at 20 rpm.

25. The method according to claim 16, wherein a source of the hard kaolin is the Para state of Brazil.

26. The method according to claim 16, wherein a source of the hard kaolin is the Rio Capim deposit.

27. A composition comprising kaolin having a particle size distribution such that at least about 90% of the kaolin has a particle size of less than 1 micron and a median particle size ($d_{50}$) ranging from 0.25 μm to less than about 0.35 μm, a $Fe_2O_3$ content in an amount less than about 0.8% by weight relative to the total weight of the solids content, and a GE brightness of at least about 91, said kaolin being derived from a crude kaolin having a $Fe_2O_3$ content of at least about 1.0%.

* * * * *

UNITED STATES PATENT AND TRADEMARK OFFICE
CERTIFICATE OF CORRECTION

PATENT NO. : 7,780,779 B2
APPLICATION NO. : 11/349216
DATED : August 24, 2010
INVENTOR(S) : Michael J. Garska et al.

It is certified that error appears in the above-identified patent and that said Letters Patent is hereby corrected as shown below:

On the Title Page Item (75) Inventors: "Ismail Yildirum" should read -- Ismail Yildirim --.

Claim 16, col. 12, line 61, "TiO2" should read -- $TiO_2$ --.

Claim 16, col. 12, line 63, "Fe203" should read -- $Fe_2O_3$ --.

Signed and Sealed this

Second Day of November, 2010

David J. Kappos
*Director of the United States Patent and Trademark Office*